US010264578B2

United States Patent
Baghel et al.

(10) Patent No.: US 10,264,578 B2
(45) Date of Patent: Apr. 16, 2019

(54) LISTEN BEFORE TRANSMIT (LBT) COMMUNICATION CHANNEL FOR VEHICLE-TO-VEHICLE COMMUNICATIONS

(71) Applicant: QUALCOMM INCORPORATED, San Diego, CA (US)

(72) Inventors: Sudhir Kumar Baghel, Hillsborough, NJ (US); Junyi Li, Chester, NJ (US); Shailesh Patil, San Diego, CA (US); Georgios Tsirtsis, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/704,525

(22) Filed: Sep. 14, 2017

(65) Prior Publication Data

US 2018/0220418 A1 Aug. 2, 2018

Related U.S. Application Data

(60) Provisional application No. 62/452,667, filed on Jan. 31, 2017.

(51) Int. Cl.
*H04W 72/04* (2009.01)
*H04L 5/00* (2006.01)
*H04W 74/08* (2009.01)
*H04L 29/08* (2006.01)

(52) U.S. Cl.
CPC ....... *H04W 72/0446* (2013.01); *H04L 5/0046* (2013.01); *H04W 74/0808* (2013.01); *H04L 67/12* (2013.01); *H04W 72/04* (2013.01); *H04W 74/0833* (2013.01)

(58) Field of Classification Search
CPC .................................. H04W 72/0446
USPC ....................................... 370/329
See application file for complete search history.

(56) References Cited

U.S. PATENT DOCUMENTS

| 2015/0271847 | A1* | 9/2015 | Luo | H04W 74/002 |
| | | | | 370/329 |
| 2016/0066337 | A1 | 3/2016 | Sartori et al. | |
| 2016/0226637 | A1* | 8/2016 | Nory | H04L 5/0053 |
| 2017/0048829 | A1 | 2/2017 | Kim et al. | |
| 2017/0289733 | A1* | 10/2017 | Rajagopal | H04W 4/005 |

FOREIGN PATENT DOCUMENTS

| EP | 3136781 A1 | 3/2017 |
| WO | 2015143170 A1 | 9/2015 |
| WO | 2015163662 A1 | 10/2015 |
| WO | 2015168908 A1 | 11/2015 |

OTHER PUBLICATIONS

International Search Report and Written Opinion—PCT/US2018/012724—ISA/EPO—dated Mar. 28, 2018.

* cited by examiner

*Primary Examiner* — Samina F Choudhry
(74) *Attorney, Agent, or Firm* — Smith Tempel Blaha LLC

(57) ABSTRACT

A method for communication includes transmitting a listen before talk (LBT) communication symbol in a communication frame, the LBT communication symbol defining an amount of resource anticipated for control information and data, transmitting a control channel using the amount of resource defined by the communication symbol, and transmitting a data channel using the amount of resource defined by the communication symbol.

16 Claims, 13 Drawing Sheets

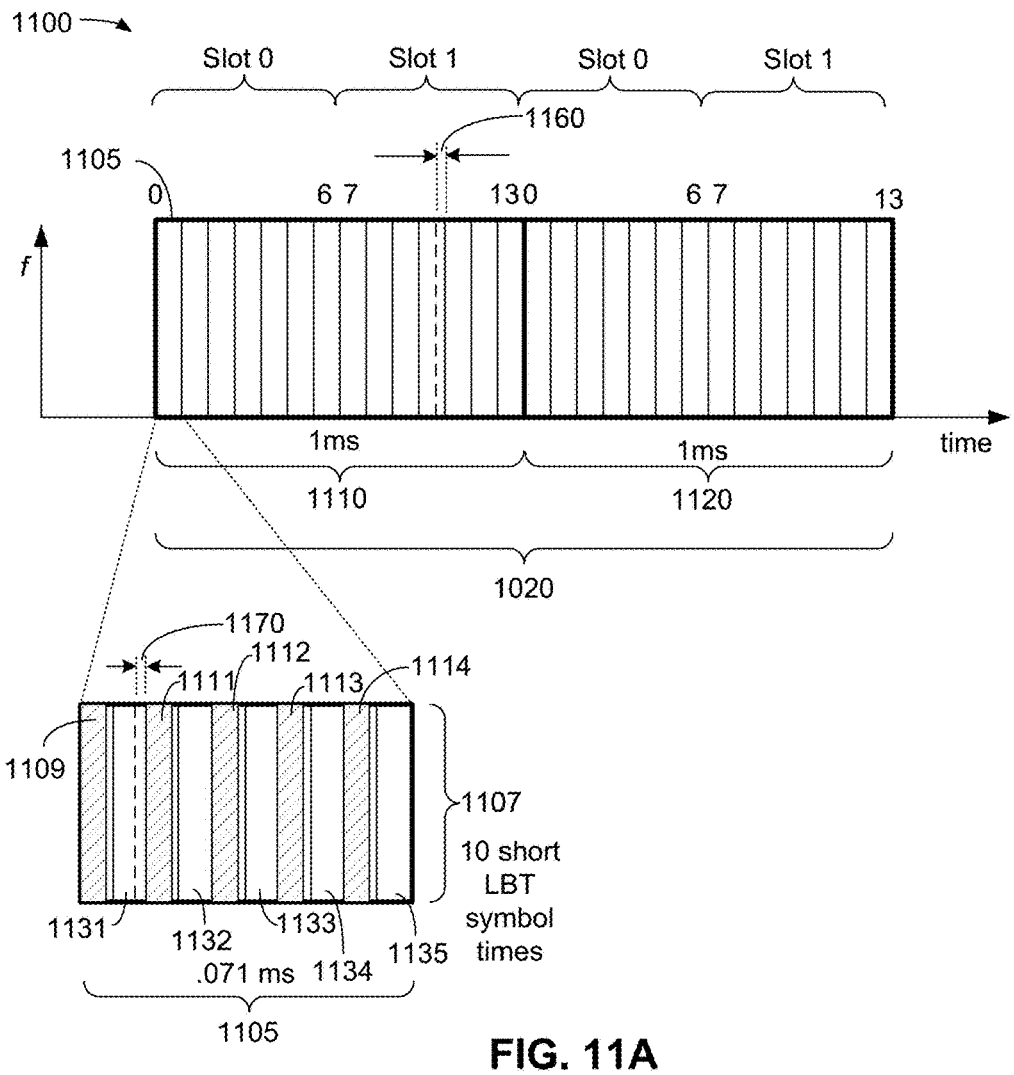
FIG. 11A
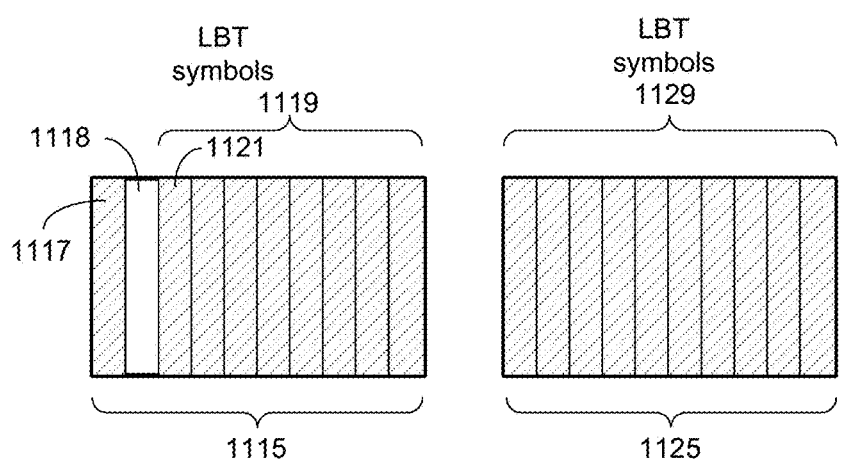
FIG. 11B  FIG. 11C

LISTEN BEFORE TRANSMIT (LBT) COMMUNICATION CHANNEL FOR VEHICLE-TO-VEHICLE COMMUNICATIONS

RELATED APPLICATIONS

This application claims the benefit of U.S. Provisional Patent Application No. 62/452,667, entitled "Listen Before Transmit (LBT) Communication Channel For Vehicle-To-Vehicle Communications," filed Jan. 31, 2017, the contents of which are hereby incorporated herein by reference in their entirety.

TECHNICAL FIELD

The present disclosure relates to wireless communication systems, and more particularly to establishing a communication channel for vehicle-to-vehicle communications. Certain embodiments enable and provide communication techniques that can include resource allocation to establish one or more communication channels for vehicle-to-vehicle communications.

INTRODUCTION

Wireless communications devices, sometimes referred to as user equipment (UE), may communicate with a base station or may communicate directly with another UE. When a UE communicates directly with another UE, the communication is referred to as device-to-device (D2D) communication. In particular use cases, a UE may be a wireless communication device, such as a portable cellular device, or may be a vehicle, such as an automobile, or may be any other connected device.

When the UE is a vehicle, such as an automobile, the D2D communication may be referred to as vehicle-to-vehicle (V2V) communication. Other vehicle-based UE communications may include vehicle-to-everything (V2X), which may include V2V, vehicle-to-infrastructure (V2I), vehicle-to-network (V2N), and vehicle-to-pedestrian (V2P). Vehicle-to-everything (V2X) communications and particularly, V2V communications will become more and more important in the future for collision avoidance and autonomous driving.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication. Method embodiments can include transmitting a listen before talk (LBT) communication symbol in a communication frame, the LBT communication symbol defining an amount of resource anticipated for control information and data, transmitting a control channel using the amount of resource defined by the communication symbol, and transmitting a data channel using the amount of resource defined by the communication symbol.

Another aspect of the disclosure provides an apparatus for communication comprising a transmitter configured to transmit a listen before talk (LBT) communication symbol in a communication frame, the LBT communication symbol defining an amount of resource anticipated for control information and data, the transmitter configured to transmit a control channel using the amount of resource defined by the communication symbol, and the transmitter configured to transmit a data channel using the amount of resource defined by the communication symbol.

Another aspect of the disclosure provides a device including means for transmitting a listen before talk (LBT) communication symbol in a communication frame, the LBT communication symbol defining an amount of resource anticipated for control information and data, means for transmitting a control channel using the amount of resource defined by the communication symbol, and means for transmitting a data channel using the amount of resource defined by the communication symbol.

Another aspect of the disclosure provides a non-transitory computer-readable medium storing computer executable code for communication, the code executable by a processor to transmit a listen before talk (LBT) communication symbol in a communication frame, the LBT communication symbol defining an amount of resource anticipated for control information and data, transmit a control channel using the amount of resource defined by the communication symbol, and transmit a data channel using the amount of resource defined by the communication symbol.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIG. 11A is a schematic diagram showing an exemplary embodiment of a portion of the LBT channel of FIG. 10 in additional detail, in accordance with various aspects of the present disclosure.

FIG. 11B is a diagram showing an exemplary embodiment of a symbol time having a number of LBT symbols.

FIG. 11C is a diagram showing an exemplary embodiment of a symbol time having a number of LBT symbols.

DETAILED DESCRIPTION

Figure 1:
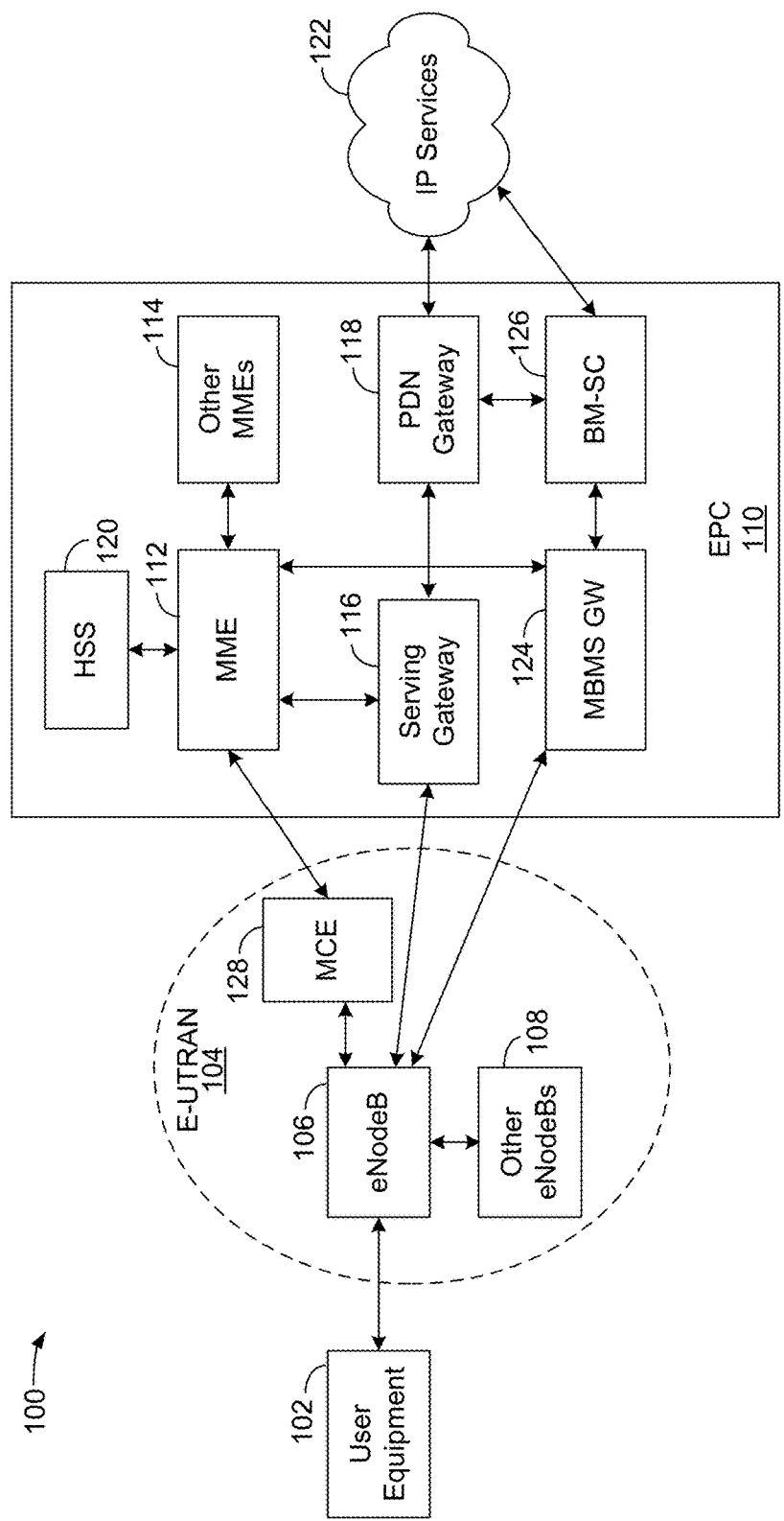
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to device-to-device (D2D) and, more particularly, vehicle-to-vehicle (V2V) communication in which a communication channel can be established that allows efficient vehicle-to-vehicle communications.

One way to improve the safety of self-driving cars is using V2V communication to share information between and among vehicles. Typically, sensors used for self-driving vehicles include Lidar, radar, cameras, etc. However, these sensors rely substantially on line of sight transmission. Typically, V2V communication on the other hand is not line of sight and, therefore, may be able to augment line of sight sensors. This can be particularly helpful for the case where two vehicles are approaching an intersection where there is no clear line of sight path between the vehicles. In an exemplary embodiment, sensor information that previously relied on a clear line of sight path can be shared between and among other vehicles using a direct communication link between vehicles. One of the challenges of establishing a direct communication link between and among vehicles is the establishment of a control channel so that one or more vehicles may directly communicate. Therefore, it is desirable to establish an efficient control channel for V2V communication.

As used herein, the term "NR" refers to "new radio" which is a way of referring to a radio interface that may be part of the 5G communication methodology. The term "NR" can be used interchangeably with the term "5G."

The communication traffic generated by self-driving vehicle sensors has following characteristics. It is generally bursty in nature, based mainly on a request for the sensor feed, it is generally variable in size depending upon number of detected objects (or deltas), it may not be able to fit a complete transmission in one communication subframe, even in high density situations, not all vehicles necessarily transmit, and it generally dictates higher reliability and low latency communication links. To make medium access more efficient than random access, some form of listen before transmit (LBT) communication methodology is useful. The term "LBT" refers to a communication methodology in which a communication device receives a transmission that may include communication channel parameters, control information, etc., before it transmits a communication message.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services; however, as those skilled in the art will readily appreciate, the various concepts presented throughout this disclosure may be extended to networks providing circuit-switched services.

The E-UTRAN 104 includes a base station, such as, for example the evolved Node B (eNB) 106 and other eNBs 108, which may include a gNodeB (gNB) a Home NodeB, a Home eNodeB, or a base station using some other suitable terminology. For example, in a 5G or New Radio (NR) network, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, drone, vehicle, industrial equipment, medical equipment, wearable, entertainment device, recreational device, mammal implantable device, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
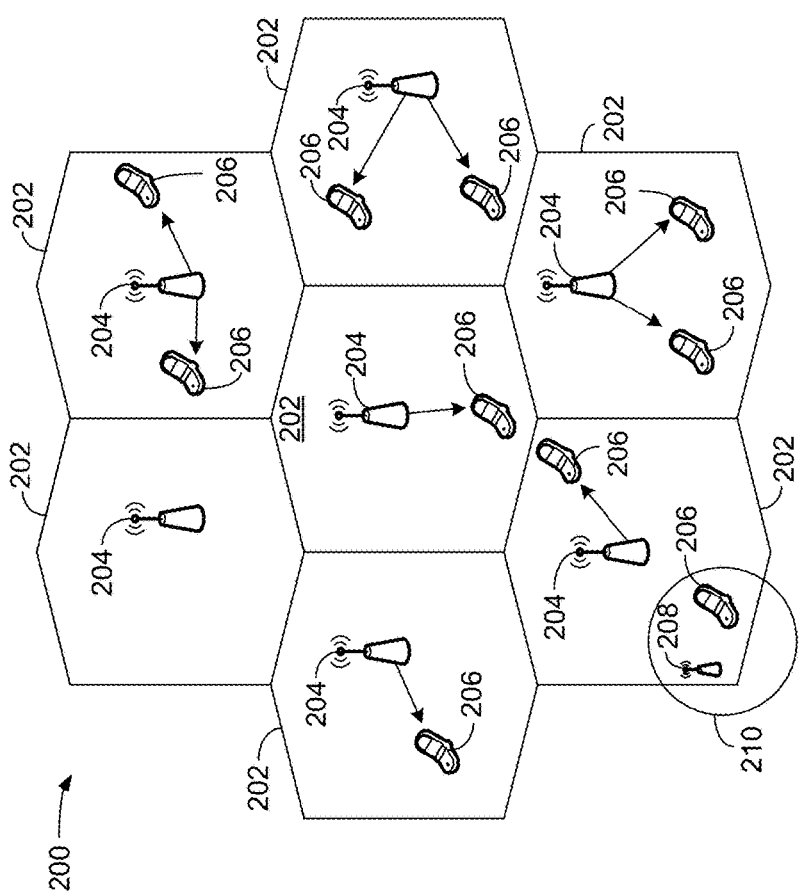
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "gNB", "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
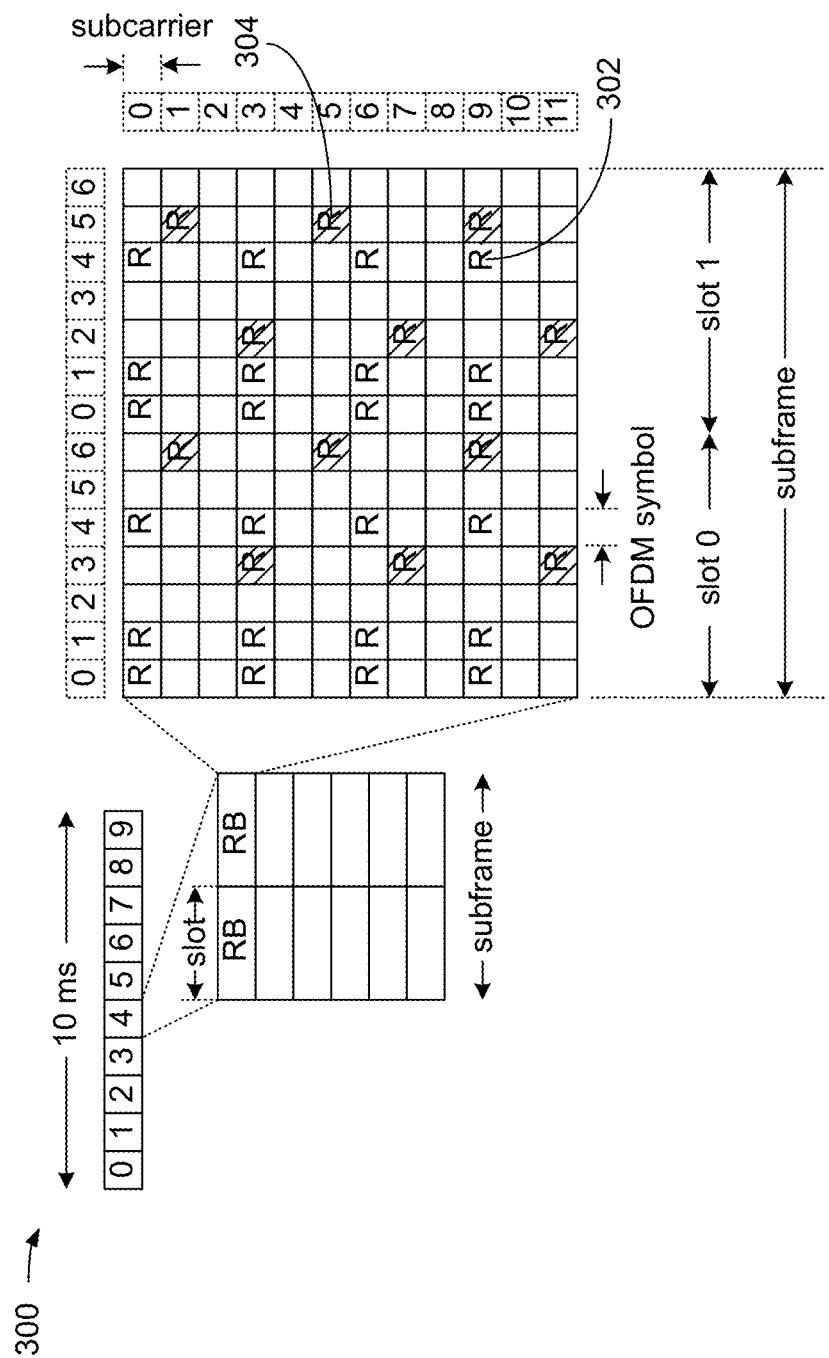
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
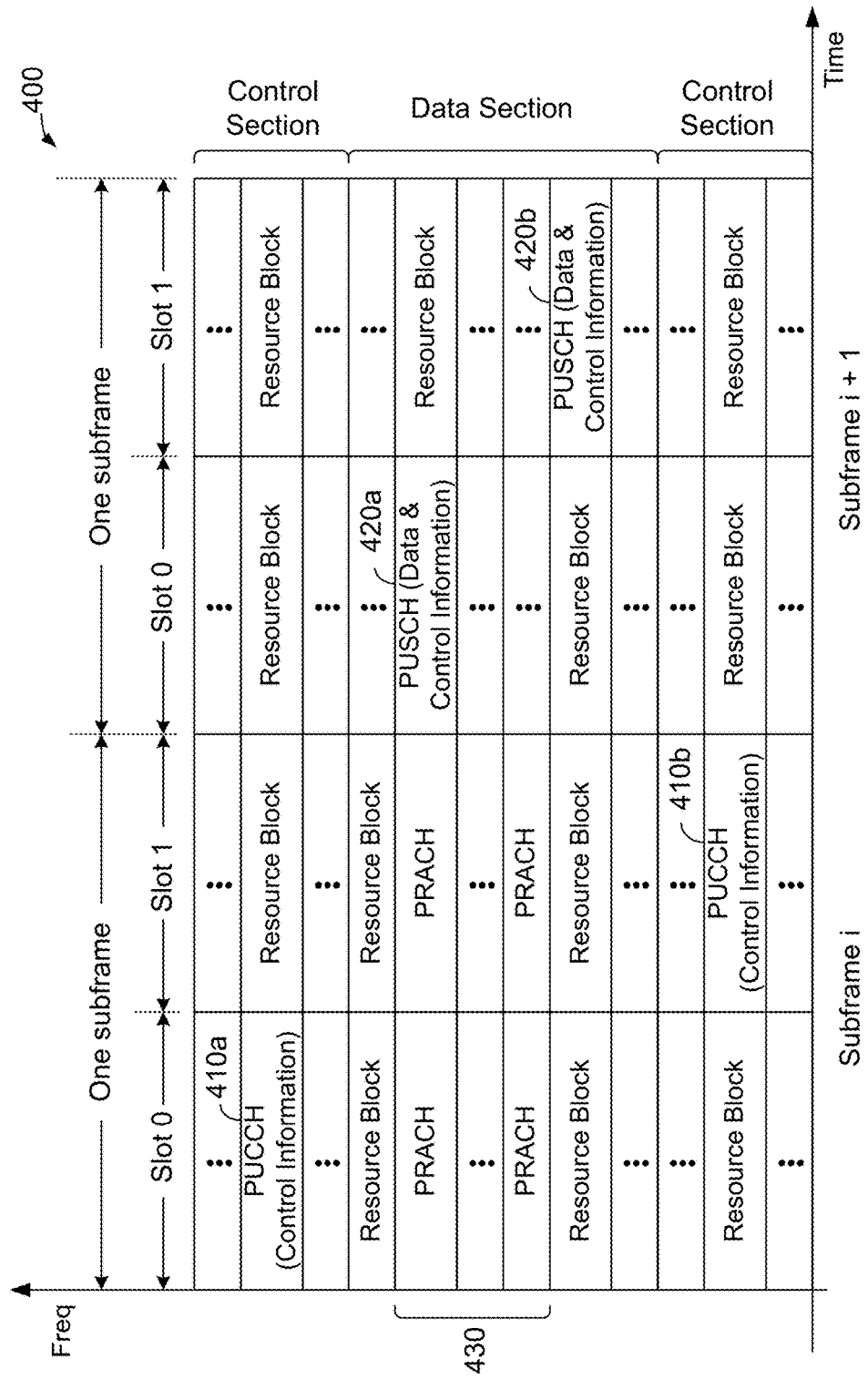
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
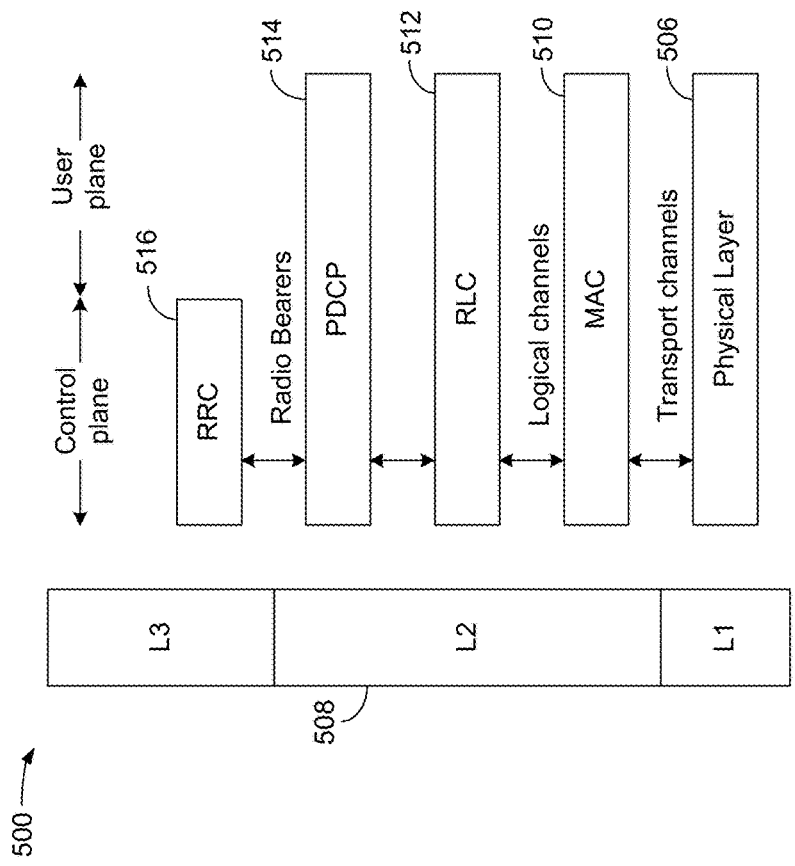
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
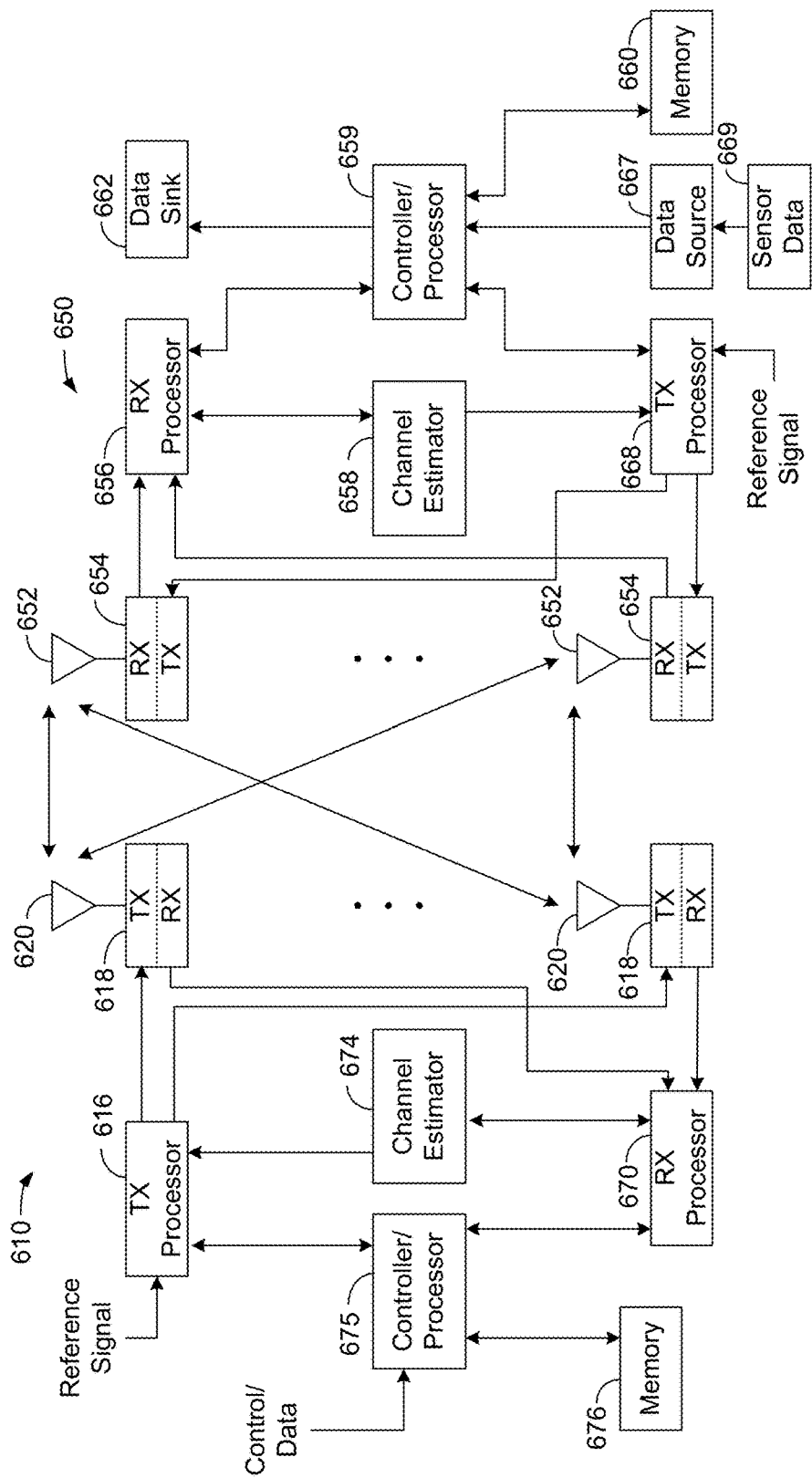
FIG. 6 is a diagram illustrating an example of an evolved Node B and user equipment in an access network in accordance with various aspects of the present disclosure.

FIG. 6 is a block diagram of an eNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

In an exemplary embodiment, a sensor data element 669 may provide one or more sensor data to the data source 667. For example, the sensor data element 669 may aggregate, or comprise, one or more of light detection and ranging (LIDAR) sensor data, radio detection and ranging (RADAR) sensor data, camera data, or other sensor data.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
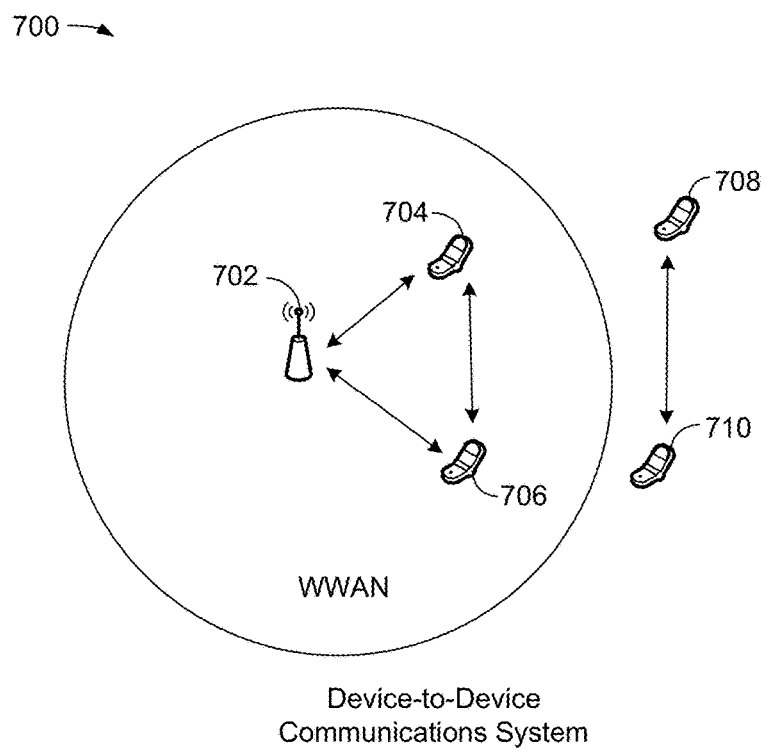
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system (as shown and described in FIG. 1 and in FIG. 2), such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. Yet one of ordinary skill in the art would understand that the exemplary methods and apparatuses are applicable more generally to a variety of other wireless device-to-device communication systems or communication networks such as 5G and beyond.

In wireless networks, such as an LTE network or a NR (5G) network, some UEs may know their location while other UEs may not. In an exemplary embodiment, UEs that know their location may determine their location using global positioning system (GPS) technology, and other technology. In another exemplary embodiment, UEs may have a fixed location that is preconfigured. UEs that do not know their location may lack GPS or may be in an indoor environment. In some instances, UEs that do not know their location may determine their position or location using signals received from a base station. Positioning and locating using base station signaling; however, may be inaccurate because the distance from the base station to the UE may be difficult to estimate accurately due to a lack of a direct path (e.g., non-line-of-sight) between the base station and the UE. As such, the error in estimation may be significant (e.g., 50 meters or more).

In an exemplary embodiment, a UE that does not know its location may determine its location from UEs that know their location using D2D positioning. D2D positioning through D2D signaling may be performed using device-to-device ranging methodologies, including, for example, techniques such as time of arrival (TOA) measurement or time difference of arrival (TDOA) measurement. A UE may determine its position using TOA/TDOA and the known positions of proximate UEs.

Figure 8:
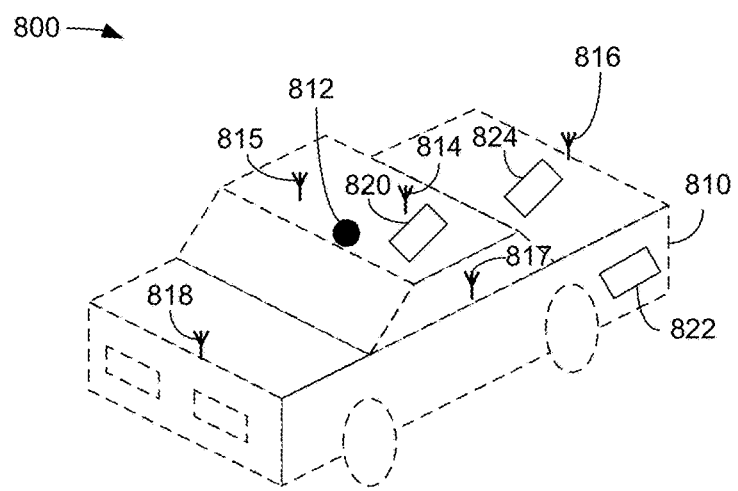
FIG. 8 is a schematic diagram illustrating a vehicle for use in device-to-device communications, in accordance with various aspects of the present disclosure.

FIG. 8 is a schematic diagram 800 illustrating a vehicle for use in device-to-device communications, in accordance with various aspects of the present disclosure. In an exemplary embodiment, the device in FIG. 8 can be a UE and can be located on, located in, or can comprise a vehicle 810. While an automobile is shown as the vehicle 810 in FIG. 8, the UE can comprise other vehicles, such as, a truck, a drone, or any other vehicle. In an exemplary embodiment, the vehicle 810 may comprise a GPS antenna 812, and one or more radio frequency (RF) antennas. In an exemplary embodiment, the vehicle 810 may comprise RF antennas 814, 815, 816, 817 and 818, configured to perform vehicle-to-vehicle (V2V) ranging, vehicle-to-everything (V2X) ranging, or other vehicle ranging operations. However, the vehicle 810 may comprise more or fewer RF antennas. In an exemplary embodiment, the RF antennas 814, 815, 816, 817 and 818 may be located at generally the periphery, or edges, of the vehicle 810. For example, the RF antenna 814 may be located on the roof of the vehicle 810. The RF antenna 815 may be located on one side of the vehicle 810, for example, the driver's side for a left-hand drive vehicle 810. The RF antenna 816 may be located on the front edge of the vehicle 810. The RF antenna 817 may be located on one side, for example, the passenger side for a left-hand drive vehicle 810. The RF antenna 818 may be located on the rear edge of the vehicle 810. The GPS antenna 812 may be in operative communication with one or more GPS satellites. The RF antennas 814, 815, 816, 817 and 818 may be in operative communication with one or more base stations (for example, one or more eNBs), one or more UEs, or one or more other stationary or mobile devices.

The vehicle 810 may also comprise one or more sensors. For example, a vehicle 810 may comprise one or more of a light detection and ranging (LIDAR) sensor 820, a radio detection and ranging (RADAR) sensor 822, a camera 824, or other sensors. Each of these sensor systems typically uses a line of sight system in that it generally has to be able to "see" the object or objects that it is attempting to detect. However, there are some situations where a vehicle may not have a clear line of sight to another vehicle, such as when two vehicles are approaching an intersection from different directions, or if the vehicles are located in a densely inhabited environment. In such situations, it may be desirable for the sensors 820, 822 and 824 in the vehicle 810 to have the ability to transmit some or all of their sensor data to another vehicle, with which the vehicle 810 may not be in clear line of sight contact.

Figure 9:
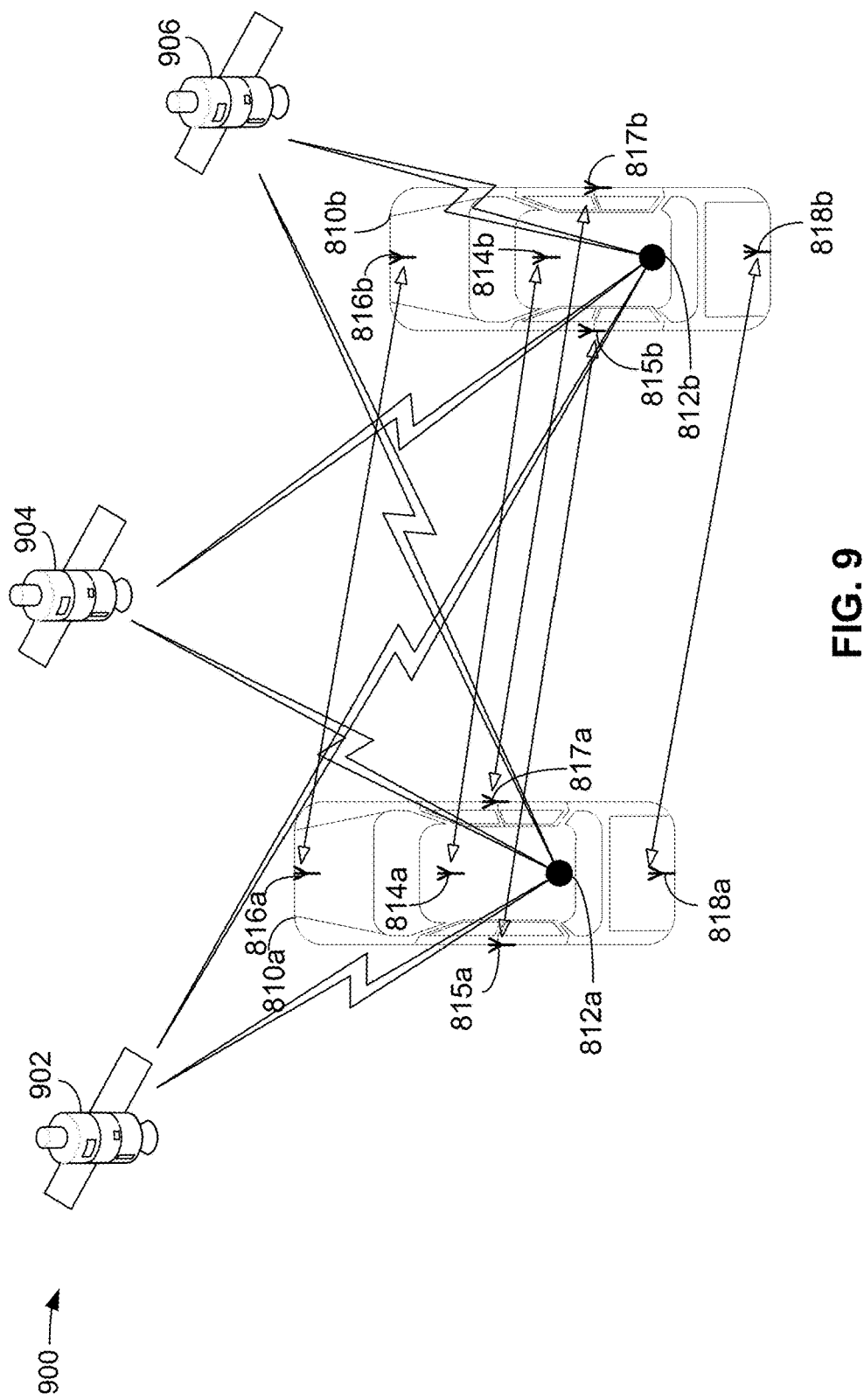
FIG. 9 is a schematic diagram illustrating a V2V communication system, in accordance with various aspects of the present disclosure.

FIG. 9 is a schematic diagram illustrating a V2V communication system, in accordance with various aspects of the present disclosure. The communication system 900 comprises GPS satellites 902, 904 and 906 in communication with two vehicles, a first vehicle 810*a* and a second vehicle 810*b*. Although only two vehicles are shown in FIG. 9, it should be understood that there may be more or fewer vehicles in such a communication system. In an exemplary embodiment, the vehicles 810*a* and 810*b* may be equipped with one or more of the light detection and ranging (LIDAR) sensor 820, the radio detection and ranging (RADAR) sensor 822, the camera 824, or other sensors mentioned in FIG. 8 with regard to the vehicle 810. However, the details of the sensors are omitted from FIG. 9 for clarity.

The first vehicle 810*a* may comprise a GPS antenna 812*a*, and one or more radio frequency (RF) antennas. In an exemplary embodiment, the first vehicle 810*a* may comprise RF antennas 814a, 815a, 816a, 817a and 818a. In an exemplary embodiment, the RF antennas 814a, 815a, 816a, 817a and 818a may be located at generally the periphery, or edges, of the first vehicle 810a. For example, the RF antenna 814a may be located on the roof of the first vehicle 810a. The RF antenna 815a may be located on one side, for example, the driver's side for a left-hand drive first vehicle 810a. The RF antenna 816a may be located on the front edge of the first vehicle 810a. The RF antenna 817a may be located on one side, for example, the passenger side for a left-hand drive first vehicle 810a. The RF antenna 818a may be located on the rear edge of the first vehicle 810a. In an exemplary embodiment, the first vehicle 810a may be an embodiment of the vehicle 810 of FIG. 8.

The second vehicle 810b may comprise a GPS antenna 812b, and one or more radio frequency (RF) antennas. In an exemplary embodiment, the second vehicle 810b may comprise RF antennas 814b, 815b, 816b, 817b and 818b. In an exemplary embodiment, the RF antennas 814b, 815b, 816b, 817b and 818b may be located at generally the periphery, or edges, of the second vehicle 810b. For example, the RF antenna 814b may be located on the roof of the second vehicle 810b. The RF antenna 815b may be located on one side, for example, the driver's side for a left-hand drive second vehicle 810b. The RF antenna 816b may be located on the front edge of the second vehicle 810b. The RF antenna 817b may be located on one side, for example, the passenger side for a left-hand drive second vehicle 810b. The RF antenna 818b may be located on the rear edge of the second vehicle 810b. In an exemplary embodiment, the second vehicle 810b may be an embodiment of the vehicle 810 of FIG. 8.

In an exemplary embodiment, the first vehicle 810a and the second vehicle 810b are in operative communication with GPS satellites 902, 904 and 906. Although three GPS satellites are shown in FIG. 9, more or fewer GPS satellites may be in operative communication with the first vehicle 810a and the second vehicle 810b. In an exemplary embodiment, the GPS antenna 812a on the first vehicle 810a generates a GPS location. Similarly, the GPS antenna 812b on the second vehicle 810b generates a GPS location.

In an exemplary embodiment, the RF antennas 814a, 815a, 816a, 817a and 818a each transmit a ranging signal using distinct radio parameters, or radio resources, which can differentiate the ranging signal transmitted by each of the RF antennas 814a, 815a, 816a, 817a and 818a. Similarly, the RF antennas 814b, 815b, 816b, 817b and 818b each transmit a ranging signal using distinct radio parameters, or radio resources, which can differentiate the ranging signal transmitted by each of the RF antennas 814b, 815b, 816b, 817b and 818b.

In an exemplary embodiment, the RF antenna 814a transmits a ranging signal that can be received and decoded by the RF antenna 814b. Similarly, the RF antenna 814b transmits a ranging signal that can be received and decoded by the RF antenna 814a.

In an exemplary embodiment, the RF antenna 815a transmits a ranging signal that can be received and decoded by the RF antenna 815b. Similarly, the RF antenna 815b transmits a ranging signal that can be received and decoded by the RF antenna 815a.

In an exemplary embodiment, the RF antenna 816a transmits a ranging signal that can be received and decoded by the RF antenna 816b. Similarly, the RF antenna 816b transmits a ranging signal that can be received and decoded by the RF antenna 816a.

In an exemplary embodiment, the RF antenna 817a transmits a ranging signal that can be received and decoded by the RF antenna 817b. Similarly, the RF antenna 817b transmits a ranging signal that can be received and decoded by the RF antenna 817a.

In an exemplary embodiment, the RF antenna 818a transmits a ranging signal that can be received and decoded by the RF antenna 818b. Similarly, the RF antenna 818b transmits a ranging signal that can be received and decoded by the RF antenna 818a.

However, any of the RF antennas 814a, 815a, 816a, 817a and 818a can be configured to transmit to any of the antennas on the second vehicle 810b. Similarly, any of the RF antennas 814b, 815b, 816b, 817b and 818b can be configured to transmit to any of the antennas on the first vehicle 810a.

In an exemplary embodiment, at least one RF antenna on the first vehicle 810a performs a ranging operation with at least one RF antenna located on the second vehicle 810b to develop a ranging measurement. The ranging measurement can be obtained using the techniques described herein.

Although illustrated as an automobile, the vehicle 810 may be other types of vehicles, such as, for example, a drone, a manned or an unmanned aerial vehicle, a remote controlled vehicle, or any other vehicle.

Figure 10:
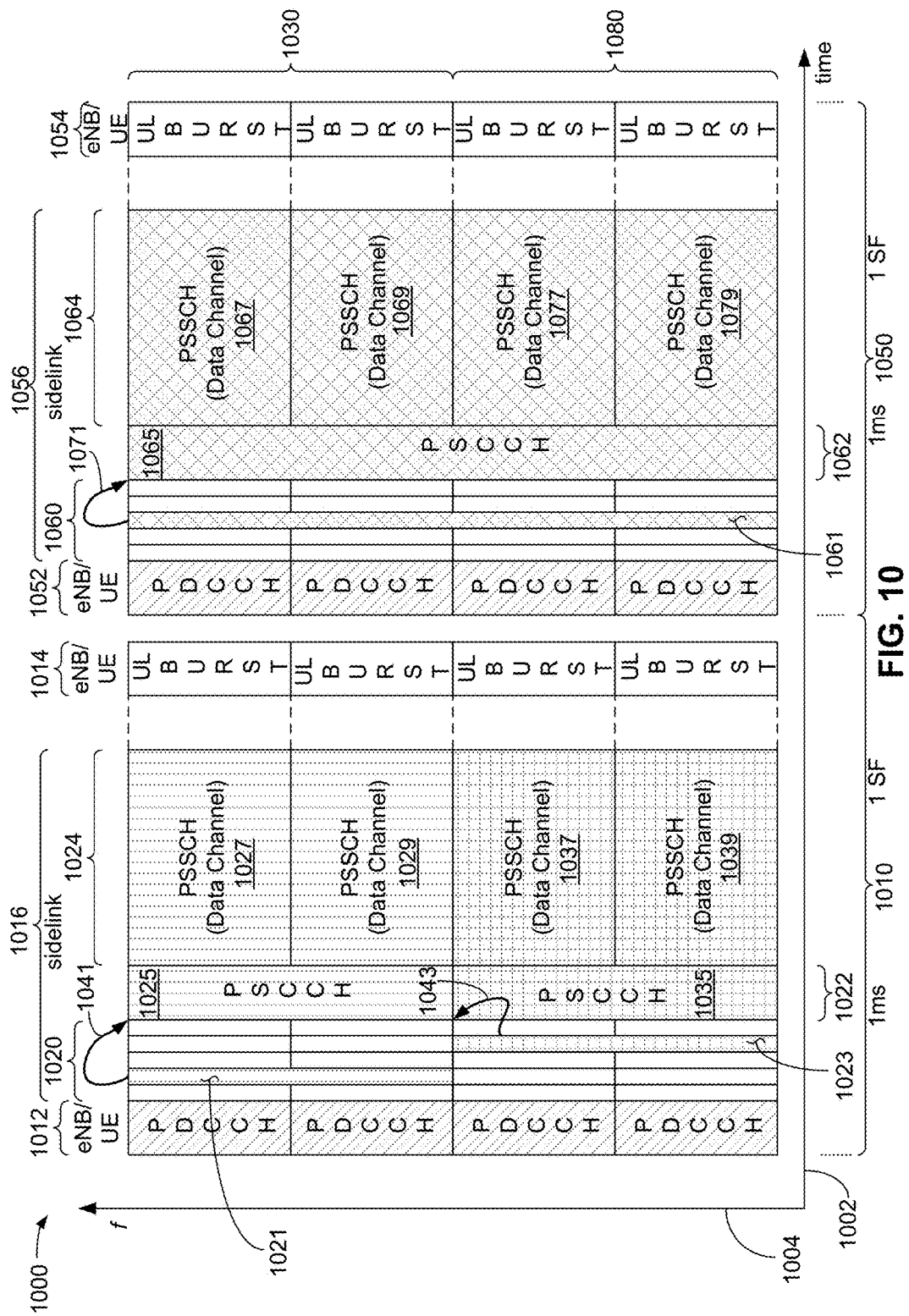
FIG. 10 is a diagram illustrating an example of a frame structure, in accordance with various aspects of the present disclosure.

FIG. 10 is a diagram illustrating an example of a communication frame structure 1000, in accordance with various aspects of the present disclosure. In an exemplary embodiment, the communication frame structure 1000 comprises a subframe 1010 and a subframe 1050. However, it should be understood that two subframes are shown for convenience only. Typically, many more subframes will be part of a communication frame structure.

The subframe 1010 and the subframe 1050 generally comprise a period of time and a set of frequencies that define a number of different resources, sometimes referred to as resource blocks, or radio resources.

In an exemplary embodiment, the subframe 1010 and the subframe 1050 may each occur over a time period of 1 millisecond (ms). However, the duration of a subframe is dependent upon a number of different parameters, and may be shorter or longer, depending on implementation. In an exemplary embodiment, the subframe 1010 and the subframe 1050 may be divided into what can be referred to as "sub channels." For example, certain frequency portions of the subframe 1010 and the subframe 1050 may comprise a sub-channel 1030 and certain frequency portions of the subframe 1010 and the subframe 1050 may comprise a sub-channel 1080. The sub-channels 1030 and 1080 are shown for illustrative purposes only as occupying one half of the frequency resources of the communication frame structure 1000. The sub-channels 1030 and 1080 are optional, and, if present, may occupy more of less of the frequency resources shown.

In an exemplary embodiment, the subframe 1010 may comprise a number of different communication channels that occupy a number of resources, both in time and in frequency. Time is shown on the horizontal axis 1002 increasing to the right and frequency is shown on the vertical axis 1004 increasing upward.

In an exemplary embodiment, the subframe 1010 may comprise a 5G physical downlink control channel (PDCCH) 1012 and an uplink channel 1014. In an exemplary embodiment, the PDCCH 1012 and the uplink channel 1014 are used for communication between a UE and a base station (eNB).

In an exemplary embodiment, the subframe 1010 may also comprise a number of radio resources that can be used for direct vehicle to vehicle (V2V) communication. These resources are generally referred to as "sidelink" resources and may be used to communicate over a "sidelink channel", and are generally referred to using the reference numeral 1016. The sidelink channel 1016 may comprise a number of radio resources including, for example, LBT channel 1020, a physical sidelink control channel (PSCCH) 1022, and a physical sidelink shared channel (PSSCH) 1024. The PSCCH 1022 is a control channel over which control information is communicated and the PSSCH 1024 is a data channel over which data is communicated. For example the above-mentioned sensor data may be communicated over the PSSCH 1024.

Similarly, in an exemplary embodiment, the subframe 1050 may comprise a 5G physical downlink control channel (PDCCH) 1052 and an uplink channel 1054. In an exemplary embodiment, the PDCCH 1052 and the uplink channel 1054 are used for communication between a UE and a base station (eNB).

In an exemplary embodiment, the subframe 1050 may also comprise a number of sidelink radio resources that can be used for direct vehicle to vehicle (V2V) communication. These "sidelink" resources are generally referred to using the reference numeral 1056. The sidelink channel 1056 may comprise a number of radio resources including, for example, LBT channel 1060, a physical sidelink control channel (PSCCH) 1062, and a physical sidelink shared channel (PSSCH) 1064. The PSCCH 1062 is a control channel over which control information is communicated and the PSSCH 1064 is a data channel over which data is communicated. For example the above-mentioned sensor data may be communicated over the PSSCH 1064.

In an exemplary embodiment, the LBT channel 1020 and the LBT channel 1060 may comprise a number of communication symbol times and communication symbols that may be shorter in length (time) than other symbol times and symbols. For example, the LBT channel 1020 and the LBT channel 1060 may occupy, for example, one (1) or two (2) symbol times, but may use a short symbol, such that, for example, ten (10) short LBT symbols may be transmitted within the few symbol times shown in the LBT channel 1020 and 1060.

In accordance with an exemplary embodiment, the LBT channel 1020 may comprise an LBT symbol 1021 that occurs in the sub-channel 1030, and an LBT symbol 1023 that occurs in the sub-channel 1080. In an exemplary embodiment, the amount of frequency resource occupied by the LBT symbol 1021 is directly proportional to, and defines, the amount of resources that the UE is requesting for direct V2V communication. For example, the amount of frequency resources occupied by the LBT symbol 1021 is the same as the amount of frequency resource occupied by the PSCCH channel 1025 and the PSSCH channels 1027 and 1029. Accordingly, the signal transmitted in the LBT symbol 1021 may be proportional to, and may be different in the frequency domain for different lengths of the LBT transmission.

Similarly, in an exemplary embodiment, the amount of resource occupied by the LBT symbol 1023 is directly proportional to, and defines, the amount of resources that the UE is requesting for direct V2V communication. For example, the amount of frequency resources occupied by the LBT symbol 1023 is the same as the amount of frequency resource occupied by the PSCCH channel 1035 and the PSSCH channels 1037 and 1039.

In other words, the length of preamble (sequence) transmitted by the LBT symbol 1021 directly corresponds to the amount of desired bandwidth resources needed for data transmission, as shown by the PSCCH channel 1025 and the PSSCH channels 1027 and 1029. Similarly, the length of preamble (sequence) transmitted by the LBT symbol 1023 directly corresponds to the amount of desired bandwidth resources needed for data transmission, as shown by the PSCCH channel 1035 and the PSSCH channels 1037 and 1039.

Similarly, in accordance with an exemplary embodiment, the LBT channel 1060 may comprise an LBT symbol 1061 that occurs in both the sub-channel 1030 and the sub-channel 1080. In an exemplary embodiment, the amount of resource occupied by the LBT symbol 1061 is directly proportional to the amount of resources that the UE is requesting for direct V2V communication. For example, the amount of frequency resources occupied by the LBT symbol 1061 is the same as the amount of frequency resource occupied by the PSCCH channel 1065 and the PSSCH channels 1067, 1069, 1077 and 1079.

In other words, the length of preamble (sequence) transmitted by the LBT symbol 1061 directly corresponds to the amount of desired bandwidth resources needed for data transmission, as shown by the PSCCH channel 1065 and the PSSCH channels 1067, 1069, 1077 and 1079.

In an exemplary embodiment, different preambles (sequences) transmitted in the LBT channels 1020 and 1060 are used to indicate the length of desired data in the frequency domain. The preamble in the LBT channels 1020 and 1060 define the amount of data requested by the UE.

In accordance with an exemplary embodiment, there is one to one mapping between the transmitted LBT preamble (sequence), control channel and corresponding data, as shown by the arrows 1041, 1043 and 1071. In this manner, LBT channel transmission reserves resources for anticipated data transmission. Accordingly, if a certain amount of frequency resource is used for LBT transmission, then a corresponding amount of frequency resource is anticipated for the corresponding control channel and data channel. In an exemplary embodiment, the LBT symbol 1021 occupies the same amount of frequency resource as does the control channel, i.e., the PSCCH 1025. Similarly, the LBT symbol 1023 occupies the same amount of frequency resource as does the control channel, i.e., the PSCCH 1035; and the LBT symbol 1061 occupies the same amount of frequency resource as does the control channel, i.e., the PSCCH 1065.

In accordance with an exemplary embodiment, the sequence transmitted by a UE in the LBT channel 1020, 1060 may be used by a receiver in another UE to estimate channel parameters, such as to adjust its automatic gain control (AGC).

In accordance with an exemplary embodiment, once a UE transmits symbols on an LBT channel for certain number of sub-channels (resources), it keeps on transmitting on those sub-channels (resources) for the remaining LBT symbols in the LBT channel 1020, 1060. For example, once a UE transmits on, for example, the $3^{rd}$ symbol in the LBT channel 1020, 1060, it will keep transmitting for the remaining symbols ($4^{th}$ through n) in the LBT channel 1020, 1060. This reduces transients when the UE transitions from the LBT channel 1020, 1060 to the control channel, i.e., the PSCCH 1025, 1065.

In accordance with an exemplary embodiment, in the LBT channel 1020, 1060, after each LBT symbol, a gap (not shown in FIG. 10) can be provided for RX/TX or TX/RX transition, also referred to as RX/TX or TX/RX "turn around." Alternatively, if another UE transmits an LBT signal on symbol 'n' then it uses 'n−1' symbol for RX/TX turn around. In another alternative, in the 'n−1' symbol, a UE can attempt to estimate the energy in a partial symbol length and take a call to perform RX/TX turn around in the remaining part of the 'n−1' symbol.

In an alternative embodiment, a different set of preambles (sequences) are used in the LBT symbols to differentiate and determine whether there is a CTS (clear to send (transmit)) signal transmitted by the receiver of this preamble.

FIG. 11A is a schematic diagram 1100 showing an exemplary embodiment of a portion of the LBT channel 1020 of FIG. 10 in additional detail, in accordance with various aspects of the present disclosure. The schematic diagram 1100 shows frequency on the vertical axis increasing upwardly and time on the horizontal axis increasing to the right. In an exemplary embodiment, the LBT channel 1020 may comprise a number of OFDM symbols in every subframe, such as in subframes 1110 and 1120. In an exemplary embodiment, the subframe 1110 and the subframe 1120 may each have a duration of approximately 1 ms. In an exemplary embodiment using the LTE communication methodology, the first subframe 1110 may comprise 14 symbols, referred to using the nomenclature 0-13, comprising a slot 0 having exemplary symbols 0-6, and a slot 1 having exemplary symbols 7-13. Similarly, the second subframe 1120 may comprise 14 symbols, referred to using the nomenclature 0-13, comprising a slot 0 having exemplary symbols 0-6, and a slot 1 having exemplary symbols 7-13.

In accordance with an exemplary embodiment, a gap may be left between adjacent symbols in the LBT channel 1020 for transmit/receive (TX/RX) transition or receive/transmit (RX/TX) transition. In an exemplary embodiment, a gap 1160 is illustrated as an exemplary embodiment of a TX/RX or a RX/TX transition period. The gap 1160 is shown for exemplary purposes at the end of symbol 10 in subframe 1110 (i.e., between symbol 10 and symbol 11 in the subframe 1110); however, a similar gap may exist at the end of, and between each symbol in all subframes if TX/RX or RX/TX transition is to occur. The purpose of the TX/RX or RX/TX transition gap is for a UE to be able to transmit in a particular communication symbol and to be able to receive a communication in the next symbol. If the UE is to receive in later symbols, it has sufficient time (a TX/RX transition gap plus one or more symbol times) for the TX/RX transition without a TX/RX transition gap.

An exemplary symbol time is shown using reference numeral 1105. In an exemplary embodiment, the symbol time 1105 may be one of 14 symbol times in the subframe 1110, and in an exemplary embodiment, may comprise ten (10) LBT symbol times, also referred to as LBT short symbol times 1107. In an exemplary embodiment, there may be a TX/RX transition gap for some or all LBT short symbol times 1107 in the symbol time 1105, with an exemplary TX/RX transition gap 1170 shown for illustrative purposes only between LBT short symbol time 2 and LBT short symbol time 3. In an exemplary embodiment, ten (10) LBT symbol times 1107 are shown in FIG. 11A, but other numbers of LBT symbol times, and LBT symbols, are possible. An exemplary LBT short symbol 1109 is shown for reference, and, in this exemplary embodiment, may occupy a fraction of the time occupied by a non-LBT communication symbol. In an exemplary embodiment, the LBT short symbol 1109 may occupy approximately 0.071 ms in time. Exemplary LBT short symbols 1111, 1112, 1113 and 1114 are also shown in alternating LBT short symbol times 1107. In accordance with an exemplary embodiment, one or more LBT symbols may be transmitted in the LBT short symbol times 1107. In an exemplary embodiment, in the example shown in FIG. 11A, every alternate LBT symbol time of the ten LBT short symbol times 1107 that do not have an LBT short symbol are used for TX/RX transition and only those UEs transmit in these symbols that have already won resources and have started LBT transmission in previous LBT symbols.

FIG. 11B is a diagram showing an exemplary embodiment of a symbol time 1115 having a number of LBT symbols. The symbol time 1115 is of similar duration as the symbol time 1105. An exemplary LBT symbol 1117 is followed by a short symbol time 1118 having no LBT transmission, which is followed by short LBT symbols 1119. The symbol time 1115 illustrates a situation in which a UE has won the transmission resources for an LBT channel, but starts transmission from the third LBT symbol 1121 and onward. In this situation, no UE starts LTB transmission from those symbols which are reserved for RX to TX transition (such as is shown by symbol time 1118). However, if a UE already started transmission in a previous symbol then the UE continues transmission even in those symbol times that would otherwise be reserved for TX/RX transition, such as symbol times 1131, 1132, 1133, 1134 and 1135 (FIG. 11A) that have no LBT symbols.

FIG. 11C is a diagram showing an exemplary embodiment of a symbol time 1125 having a number of LBT symbols. The symbol time 1125 is of similar duration as the symbol time 1105. In this exemplary embodiment, ten exemplary LBT symbols 1129 occupy the entire symbol time 1125. The symbol time 1125 illustrates a situation in which a UE has won the transmission resources for an LBT channel LBT and is transmitting LBT symbols in all subsequent LBT symbol times, including LBT symbol times for RX to TX transition.

Figure 12:
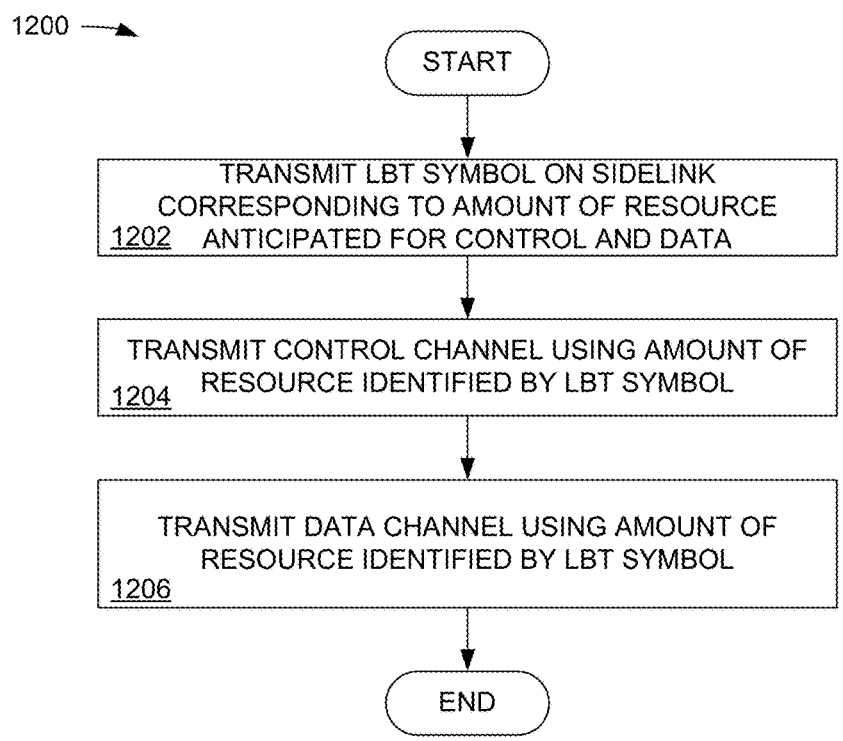
FIG. 12 is a flow chart illustrating an example of a method for communication, in accordance with various aspects of the present disclosure.

FIG. 12 is a flow chart illustrating an example of a method for communication, in accordance with various aspects of the present disclosure. The blocks in the method 1200 can be performed in or out of the order shown, and in some embodiments, can be performed at least in part in parallel.

In block 1202, a UE, such as a vehicle, transmits one or more short LBT symbols corresponding to an amount of resource anticipated for control information and data information on a sidelink communication channel. For example a UE may use an LBT channel 1020 or 1060 and the TX 654 to transmit the LBT channel.

In block 1204, a UE, such as a vehicle, transmits over a control channel using an amount of resource identified by the LBT symbol. For example, a UE may use a PSCCH channel 1025 or 1065 and the TX 654 to transmit the control channel.

In block 1206, a UE, such as a vehicle, transmits over a data channel using an amount of resource identified by the LBT symbol. For example, a UE may use a PSCCH channel 1027, 1029, 1037, 1039, 1067, 1069, 1077 and/or 1079 and the TX 654 to transmit the data channel.

Figure 13:
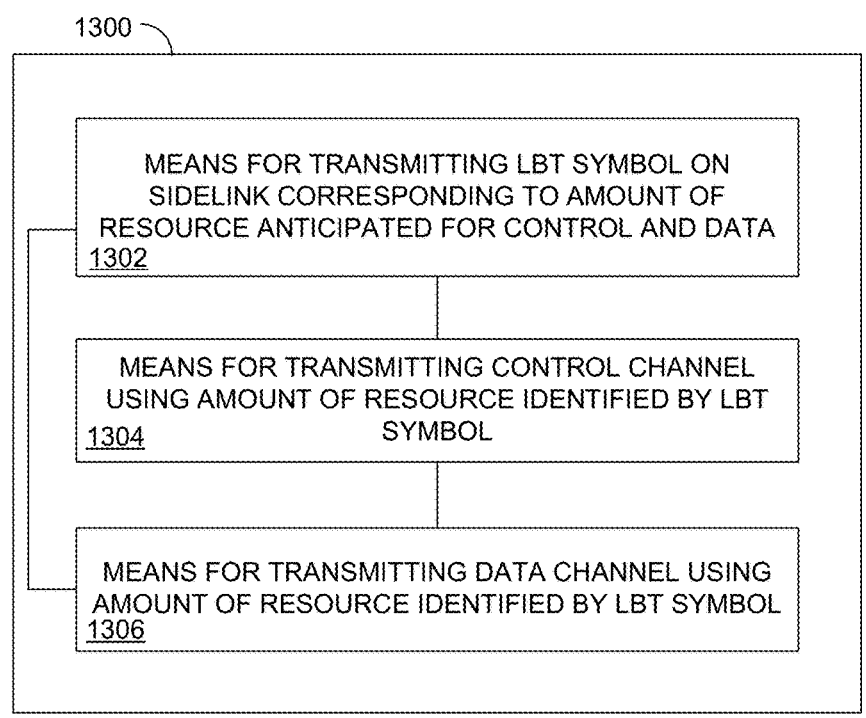
FIG. 13 is a functional block diagram of an apparatus for a communication system in accordance with various aspects of the present disclosure.

FIG. 13 is a functional block diagram of an apparatus 1300 for a communication system in accordance with various aspects of the present disclosure. The apparatus 1300 comprises means 1302 for transmitting one or more short LBT symbols corresponding to an amount of resource anticipated for control information and data information on a sidelink communication channel. In certain embodiments, the means 1302 for transmitting one or more short LBT symbols corresponding to an amount of resource anticipated for control information and data information on a sidelink communication channel can be configured to perform one or more of the function described in operation block 1202 of method 1200 (FIG. 12). In an exemplary embodiment, the means 1302 for transmitting one or more short LBT symbols corresponding to an amount of resource anticipated for control information and data information on a sidelink communication channel may comprise the UE using an LBT channel 1020 or 1060 and the TX 654 to transmit the LBT channel.

The apparatus 1300 further comprises means 1304 for transmitting over a control channel using an amount of resource identified by the LBT symbol. In certain embodiments, the means 1304 for transmitting over a control channel using an amount of resource identified by the LBT symbol can be configured to perform one or more of the function described in operation block 1204 of method 1200 (FIG. 12). In an exemplary embodiment, the means 1304 for transmitting over a control channel using an amount of resource identified by the LBT symbol may comprise the UE using a PSCCH channel 1025 or 1065 and the TX 654 to transmit the control channel.

The apparatus 1300 further comprises means 1306 for transmitting over a data channel using an amount of resource identified by the LBT symbol. In certain embodiments, the means 1306 for transmitting over a data channel using an amount of resource identified by the LBT symbol can be configured to perform one or more of the function described in operation block 1206 of method 1200 (FIG. 12). In an exemplary embodiment, the means 1306 for transmitting over a data channel using an amount of resource identified by the LBT symbol may comprise the UE using a PSCCH channel 1027, 1029, 1037, 1039, 1067, 1069, 1077 and/or 1079 and the TX 654 to transmit the data channel.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication, comprising:
    transmitting a plurality of listen before talk (LBT) communication symbols in a single non-LBT sidelink communication symbol time in a communication frame, each of the plurality of LBT communication symbols occupying a fraction of the time occupied by a non-LBT communication symbol, each LBT communication symbol defining an amount of frequency resource anticipated for control information and data in a direct vehicle-to-vehicle communication, the amount of frequency resource defined by each LBT communication symbol being less than a total frequency resource available for communication;
    transmitting a control channel using the amount of frequency resource defined by each LBT communication symbol; and
    transmitting a data channel using the amount of frequency resource defined by each LBT communication symbol.

2. The method of claim 1, wherein each LBT communication symbol defining the amount of frequency resource anticipated comprises the amount of frequency resource used by each LBT communication symbol being directly proportional in the frequency domain to an amount of frequency resource used by the control channel and by the data channel.

3. The method of claim 1, wherein each LBT communication symbol, the control channel and the data channel are transmitted in the same sub-channel.

4. The method of claim 1, wherein different LBT communication symbols may occupy different portions of frequency domain for different LBT transmissions.

5. An apparatus for communication, comprising:
    a processor operatively coupled to a memory;
    a transmitter operatively coupled to the processor, the transmitter configured to transmit a plurality of listen before talk (LBT) communication symbols in a single non-LBT sidelink communication symbol time in a communication frame, each of the plurality of LBT communication symbols occupying a fraction of the time occupied by a non-LBT communication symbol, each LBT communication symbol defining an amount of frequency resource anticipated for control information and data in a direct vehicle-to-vehicle communication, the amount of frequency resource defined by each LBT communication symbol being less than a total frequency resource available for communication;
    the transmitter configured to transmit a control channel using the amount of frequency resource defined by each LBT communication symbol; and
    the transmitter configured to transmit a data channel using the amount of frequency resource defined by each LBT communication symbol.

6. The apparatus of claim 5, wherein each LBT communication symbol defining the amount of frequency resource anticipated comprises the amount of frequency resource used by each LBT communication symbol being directly proportional in the frequency domain to an amount of resource used by the control channel and by the data channel.

7. The apparatus of claim 5, wherein each LBT communication symbol, the control channel and the data channel are transmitted in the same sub-channel.

8. The apparatus of claim 5, wherein different LBT communication symbols may occupy different portions of frequency domain for different LBT transmissions.

9. A device, comprising:
    means for processing operatively coupled to means for storing;
    means for transmitting a plurality of listen before talk (LBT) communication symbols in a single non-LBT sidelink communication symbol time in a communication frame, each of the plurality of LBT communication symbols occupying a fraction of the time occupied by a non-LBT communication symbol, each LBT communication symbol defining an amount of frequency resource anticipated for control information and data in a direct vehicle-to-vehicle communication, the amount of frequency resource defined by each LBT communication symbol being less than a total frequency resource available for communication;

means for transmitting a control channel using the amount of frequency resource defined by each LBT communication symbol; and means for transmitting a data channel using the amount of frequency resource defined by each LBT communication symbol.

10. The device of claim 9, wherein each LBT communication symbol defining the amount of frequency resource anticipated comprises the amount of frequency resource used by each LBT communication symbol being directly proportional in the frequency domain to an amount of resource used by the control channel and by the data channel.

11. The device of claim 9, wherein each LBT communication symbol, the control channel and the data channel are transmitted in the same sub-channel.

12. The device of claim 9, wherein different LBT communication symbols may occupy different portions of frequency domain for different LBT transmissions.

13. A non-transitory computer-readable medium storing computer executable code for communication, the code executable by a processor to:

transmit a plurality of listen before talk (LBT) communication symbols in a single non-LBT sidelink communication symbol time in a communication frame, each of the plurality of LBT communication symbols occupying a fraction of the time occupied by a non-LBT communication symbol, each LBT communication symbol defining an amount of frequency resource anticipated for control information and data in a direct vehicle-to-vehicle communication, the amount of frequency resource defined by each LBT communication symbol being less than a total frequency resource available for communication;

transmit a control channel using the amount of frequency resource defined by each LBT communication symbol; and transmit a data channel using the amount of frequency resource defined by each LBT communication symbol.

14. The non-transitory computer-readable medium of claim 13, wherein the code is executable by a processor to:

cause each LBT communication symbol defining the amount of frequency resource anticipated to comprise the amount of frequency resource used by each LBT communication symbol to be directly proportional in the frequency domain to an amount of resource used by the control channel and by the data channel.

15. The non-transitory computer-readable medium of claim 13, wherein the code is executable by a processor to:

transmit each LBT communication symbol, the control channel and the data channel in the same sub-channel.

16. The non-transitory computer-readable medium of claim 13, wherein the code is executable by a processor to:

generate different LBT communication symbols that may occupy different portions of frequency domain for different LBT transmissions.

* * * * *